April 23, 1957 S. S. CRUIKSHANK 2,789,887
CONDUCTIVITY CELLS OF THOMAS SAMPLERS
Filed Oct. 26, 1953
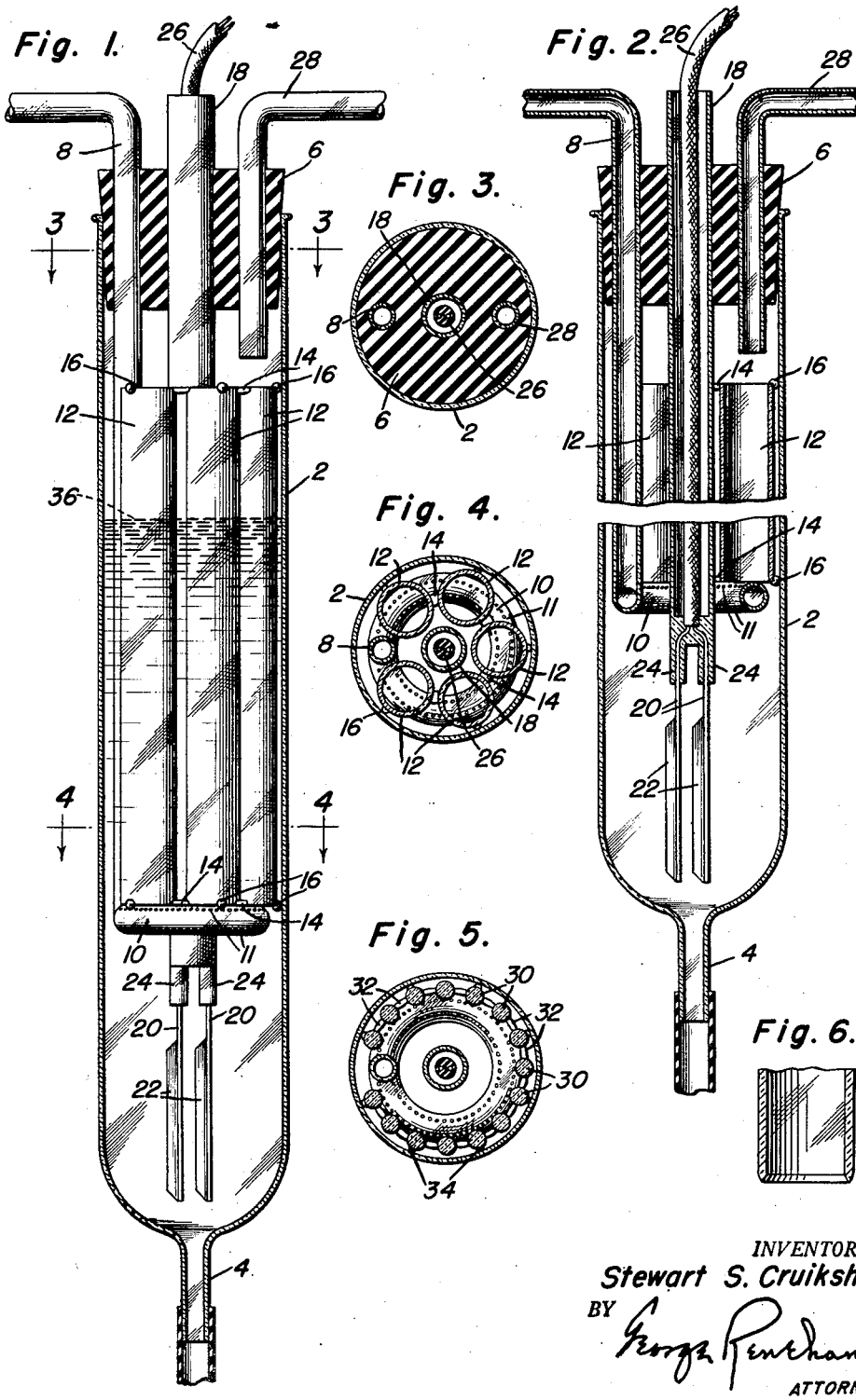
INVENTOR.
Stewart S. Cruikshank
BY
ATTORNEY

2,789,887

CONDUCTIVITY CELLS OF THOMAS SAMPLERS

Stewart S. Cruikshank, Baltimore, Md.

Application October 26, 1953, Serial No. 388,465

1 Claim. (Cl. 23—254)

(Granted under Title 35, U. S. Code (1952), sec. 266)

The invention described herein may be manufactured and used by or for the Government of the United States of America for governmental purposes without the payment to me of any royalty thereon.

This invention relates to an improvement in gas absorption cells. More particularly, it relates to an improvement in conductivity cells for Thomas samplers. Specifically, it relates to an improvement in a packing for gas absorption cells.

In gas absorption cells such as Thomas samplers it is necessary to fill and drain the cells repeatedly at short intervals. While the cell is filled the gas is bubbled up through the fluid. The conductivity of the fluid is then measured and the cell is drained to prepare for a subsequent run. Due to the fact that the period of draining is relatively short, it is difficult, with ordinary packing material, to secure complete drainage such that conductivity readings secured in subsequent runs will not be affected by fluid retention. The present invention is calculated to produce such complete drainage of the cell that subsequent readings are not substantially affected.

In the drawings, Fig. 1 shows a cross-section of a Thomas cell with the interior parts in full section. Fig. 2 shows the entire cell in section. Fig. 3 shows a section at 3—3, of Fig. 1. Fig. 4 shows a section at 4—4, of Fig. 1. Fig. 5 shows a section of a similar cell wherein a series of rods instead of tubes are used as fillers. Fig. 6 shows one of the glass tubes drawn into a knife edge at its lower end.

More particularly, in the drawings, 2 is the cell tubing; 4 is the constricted bottom of the cell to which is attached a rubber tube for filling and draining purposes; 6 is the rubber stopper closing the upper end of the cell and containing holes for the air input tube 8, the central conductor tube 18, and the air exit tube 28; 10 is the circular bottom portion of air input tube 8 which circular portion carries multiple perforations 11 through which the air is uniformly distributed throughout the cell in the form of minute bubbles; 12 is the multiple tubing which serves as the packing for the cell and which constitutes the essence of the invention. The tubes 12 are fused together by means of glass separators 14 and the entire assembly is supported away from the outer cell wall by means of fused glass beads 16. Conductors 20, 20 terminate in plates 22, 22 which are uniformly spaced from each other for conductivity measurements. The conductors 20, 20 pass up through tube 18 and terminate in the insulated cable 26.

A different structural form is shown in cross-section in Fig. 5 wherein solid rods 30 are used instead of tubes 12. These rods are fused together at 32 and are provided with glass beads 34 which serve to support the tubes away from the walls of the cell.

In operating the sampler, fluid is passed in through the bottom of the tube up to a predetermined level shown in Fig. 1. Atmospheric air is then blown in through the cell at a predetermined rate and amount through tube 8. $SO_2$ present in the air is absorbed in the fluid thereby affecting the conductivity of the fluid. After a predetermined amount of air has been passed through the cell, conductivity measurements are made between plates 22—22 by means of apparatus not shown. This reading serves as an index of the amount of $SO_2$ in the air.

When the cell is not completely drained, subsequent readings will be affected by $SO_2$ containing fluid which may adhere to the packing, and since the time allowed for draining is limited it becomes necessary to select a packing wherein drainage is prompt and complete. Although many types of packing might serve equally well to secure complete absorption of $SO_2$ from the air, the usual packing material does not drain adequately with the result that subsequent readings on conductivity tend to be larger by an amount corresponding to the retained fluid.

The packing tubes of the present structure being in spaced relationship and standing vertically tend to drain rapidly and completely. Drainage of these tubes may be enhanced by drawing the bottom end of the glass tubes into a knife edge. Drainage can be similarly enhanced by cutting the tubes at an angle thereby producing a point or points on the bottom of each tube. The fluid will tend to drain to these points and the amount of fluid retained is correspondingly very small. For normal purposes, however, the rounded flame-polished lower edges of the tubes are quite satisfactory. The packing tubes are formed into a circular cluster with one side of the circle left open as shown in Fig. 4. The purpose of this opening is to leave a space through which tube 8 may pass.

The structure shown was made particularly for use in a Thomas sampler in which atmospheric air is drawn through a sampler tube filled with absorbent liquid. The $SO_2$ in the air is adsorbed and their resulting acidity is determined by an increase in conductivity. This, in turn, gives a reading of the amount of sulfur dioxide in the air. This type of equipment may, of course, be used to detect the presence of other gases as well as sulfur dioxide. It is only necessary that the gas shall be passed upward through the absorption tube.

When one of the packing tubes shown in Figs. 1 and 3 was placed in a cell, the amount of sulfur dioxide passing through the cell and escaping detection was reduced to half percent or less whereas with no packing, 5 to 10% of the $SO_2$ escaped. Thus, both the accuracy and precision of the sampler were improved and the pure air issuing from the absorption cell could be used in a temperature compensating device which would not operate correctly on air containing appreciable amounts of sulfur dioxide. The success of this structure and its superior draining properties over that of an equivalent number of loose tubes, for instance, is believed to be dependent upon the fact that the tubes of this cluster are positioned vertically and have virtually no contact with the gas absorption tube or with each other.

I claim:

A gas absorption apparatus comprising a cylinder including means at the bottom for filling and emptying liquids therefrom and including means at the top for introducing and removing gas therefrom, said gas introducing means including a downward projecting tubing terminating in a perforated ring whereby gas may be introduced below the liquid surface of the tube in small bubbles, said perforated ring supporting a series of parallel, spaced apart glass tubes which have point attachment to each other at each extremity and having the lower edges of said glass tubes drawn to a sharp edge to allow complete drainage.

(References on following page)

References Cited in the file of this patent

UNITED STATES PATENTS

| | | |
|---|---|---|
| 678,215 | Arndt | July 9, 1901 |
| 1,013,448 | Rose | Jan. 2, 1912 |
| 2,047,444 | Stedman | July 14, 1936 |
| 2,094,357 | Huff | Sept. 28, 1937 |
| 2,198,305 | Crawford | Apr. 23, 1940 |
| 2,332,110 | Podbielniak | Oct. 19, 1943 |
| 2,395,777 | Brienjes et al. | Feb. 26, 1946 |
| 2,462,293 | Thomas | Feb. 22, 1949 |

FOREIGN PATENTS

| | | |
|---|---|---|
| 546,672 | Great Britain | July 24, 1942 |

OTHER REFERENCES

Fisher: "Modern Laboratory Appliances," copyright 1942, published by Fisher Scientific Co., Pittsburgh, Pa., pages 526, 529.